(12) United States Patent
Koto

(10) Patent No.: US 6,463,101 B1
(45) Date of Patent: Oct. 8, 2002

(54) VIDEO ENCODING METHOD AND APPARATUS

(75) Inventor: Shinichiro Koto, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/271,431

(22) Filed: Mar. 18, 1999

(30) Foreign Application Priority Data

Mar. 19, 1998 (JP) .......................................... 10-070241

(51) Int. Cl.[7] ................................................ H04B 1/66
(52) U.S. Cl. ................................................ 375/240.13
(58) Field of Search ...................... 375/240.13, 240.12, 375/240.14, 240.15, 240.03, 240.27; 348/400.1, 401.1, 409.1, 411.1; 382/236, 238; 386/125, 70, 111, 78

(56) References Cited

U.S. PATENT DOCUMENTS

| | | | |
|---|---|---|---|
| 5,726,711 A | * 3/1998 | Boyce | 348/408 |
| 5,778,143 A | * 7/1998 | Boyce | 386/111 |
| 6,065,050 A | * 5/2000 | DeMoney | 709/219 |
| 6,134,382 A | * 10/2000 | Mishima et al. | 386/68 |
| 6,240,137 B1 | * 5/2001 | Kato | 375/240.26 |
| 6,314,139 B1 | * 11/2001 | Koto et al. | 375/240.12 |

FOREIGN PATENT DOCUMENTS

| | | |
|---|---|---|
| JP | 8-307860 | 11/1996 |
| JP | 9-51538 | 2/1997 |
| JP | 9-238353 | 9/1997 |

* cited by examiner

*Primary Examiner*—Chris Kelley
*Assistant Examiner*—Behrooz Senfi
(74) *Attorney, Agent, or Firm*—Oblon, Spivak, McClelland, Maier & Neustadt, P.C.

(57) ABSTRACT

At the end of encoding of a normal GOP appearing in a predetermined interval, it is checked whether a random access point is designed in the next normal GOP. If it is determined that a random access point is designed in the next GOP, current GOP extension processing is performed to increase the number of frames constituting the current GOP. This current GOP extension processing includes the processing of changing the picture type of the frame to be encoded next in the encoding order from I to P (or B). With this processing, the GOP immediately preceding the random access point can be extended, and encoding can be performed while the random access point is made to coincide with the beginning of a new GOP interval.

26 Claims, 12 Drawing Sheets

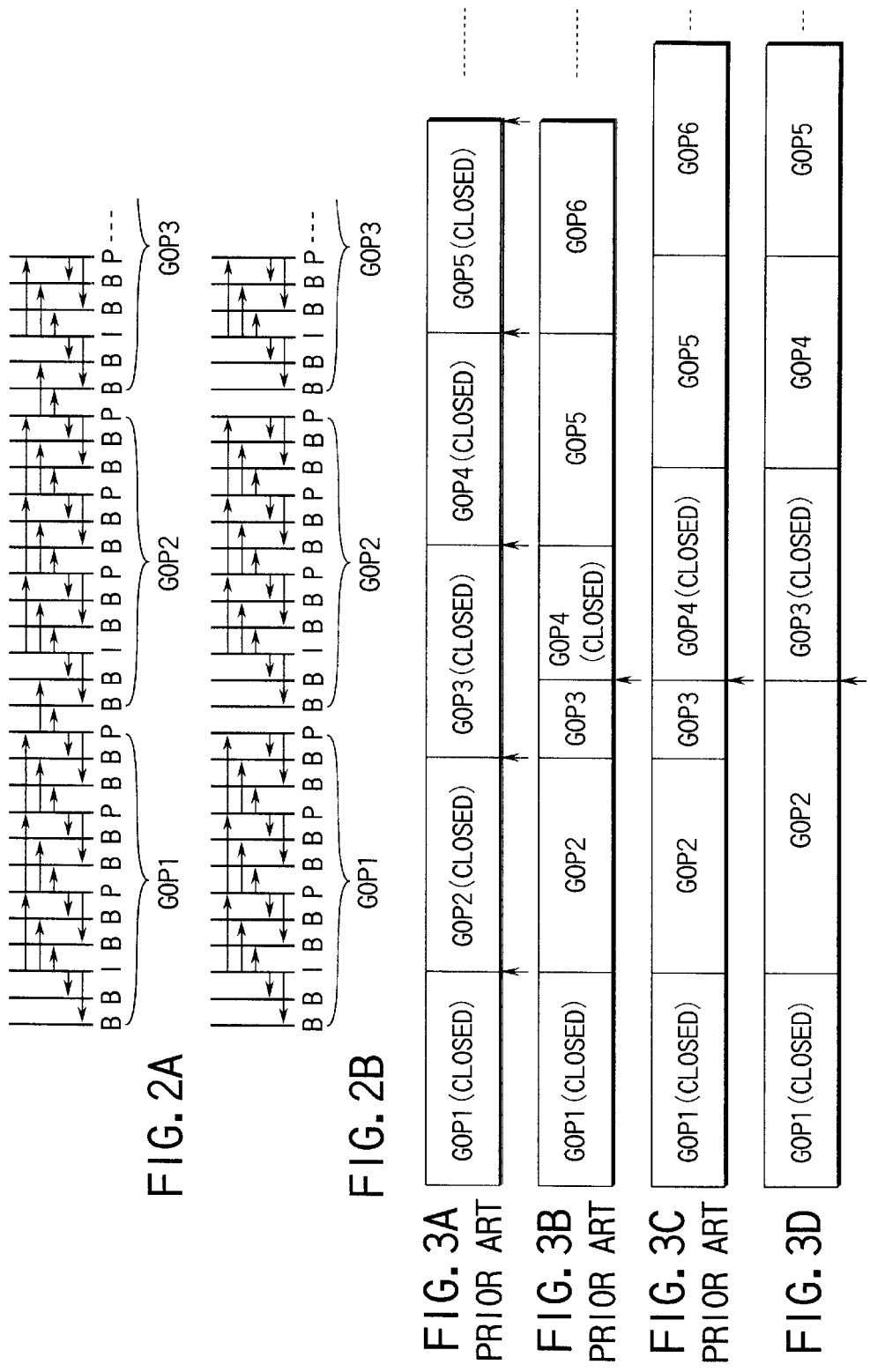

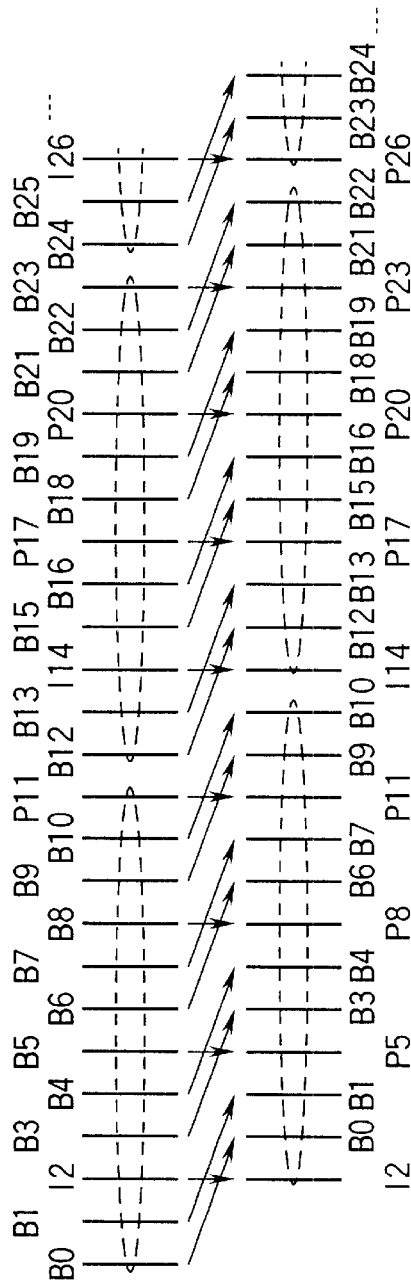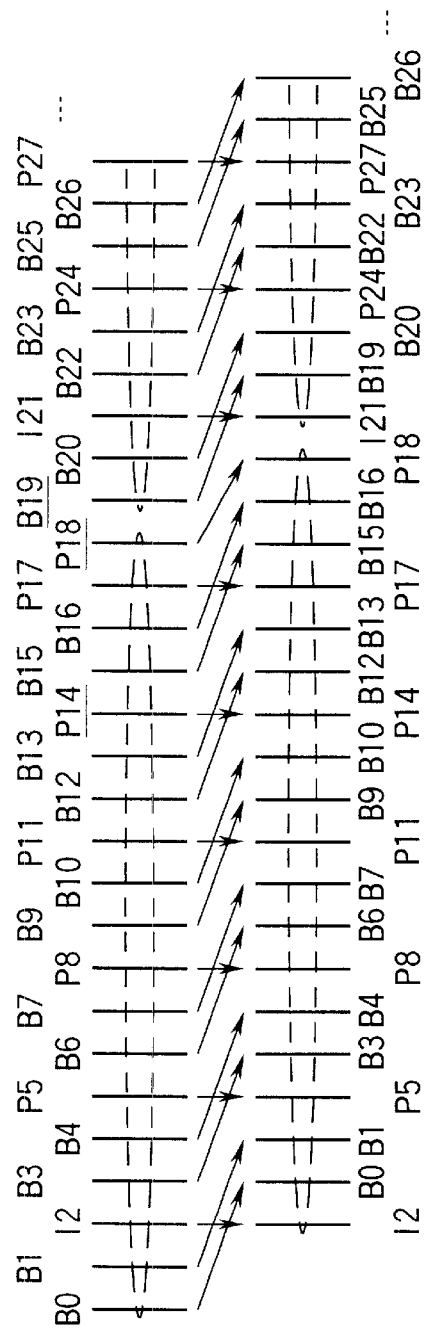
FIG. 4A
FIG. 4B
FIG. 5A
FIG. 5B

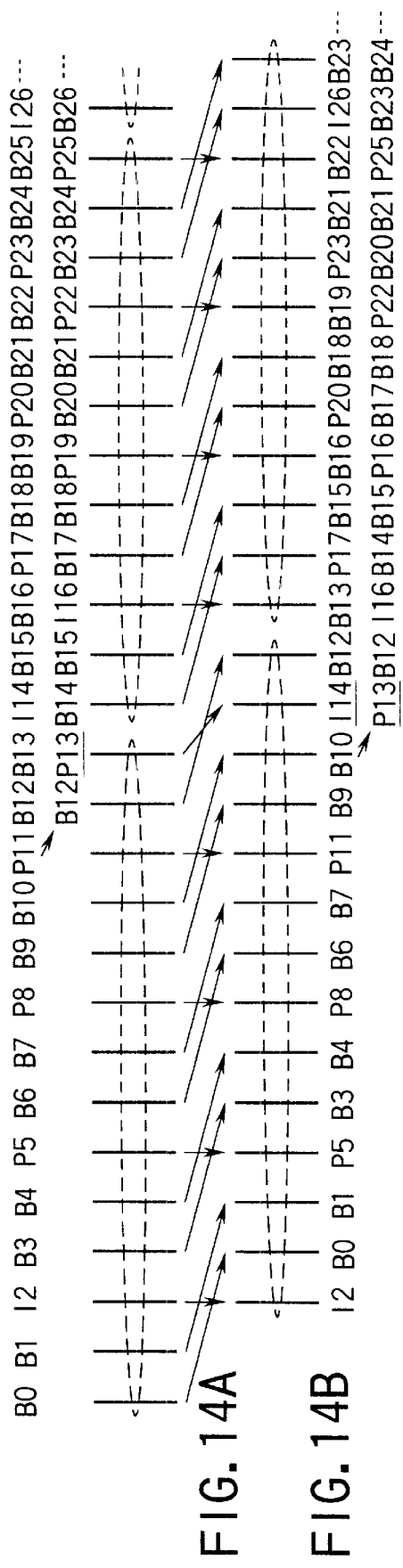

VIDEO ENCODING METHOD AND APPARATUS

BACKGROUND OF THE INVENTION

The present invention relates to a video encoding method and apparatus and, more particularly, to a video encoding method and apparatus which are improved to generate video encoded data that allow smooth random access, and facilitate edition by linking encoded data recorded on a recording medium.

According to a basic procedure in MPEG1 or MPEG2, which is an international standard as a video encoding scheme widely used for read-only optical disks such as DVDs, digital broadcasts, and the like, one picture is divided into a plurality of 8×8-pixel blocks, the DCT (discrete cosine transform) is performed for each block, and the resultant DCT coefficients are quantized and variable-length-coded. In addition, this scheme also uses motion compensated predictive inter-frame coding to use the correlation between pictures along the time axis, thereby increasing the encoding efficiency.

The motion compensated predictive inter-frame coding method is an encoding method of sequentially encoding only the predictive error between consecutive frames. In this method, therefore, when encoded data is to be decoded/played back, information of temporally different pictures must be referred to. For this reason, in general, encoded data using motion compensated predictive inter-frame coding makes it difficult to perform random access, e.g., playback from an arbitrary frame of the encoded data, and edition by linking encoded data together at an arbitrary frame.

Under the circumstances, according to the MPEG specifications, to allow random access at a specific frame or edition by linking encoded data together, encoding is performed in units of GOPs (GOP: Group Of Pictures) each consisting of a plurality of frames by setting I-Pictures, which are obtained by intra-coding, at predetermined frame intervals. In addition, the use of a closed GOP, which inhibits inter-frame prediction at a GOP boundary, allows random access and cut and paste operation for edition.

A closed GOP is an independent GOP which does not depend on any pictures of other GOPs, and can be used as an editable point, i.e., a point at which random access from MPEG data is allowed. The number of random access points can be increased by decreasing the number of frames constituting each GOP, and making each GOP become a closed GOP.

If, however, a structure in which the number of frames constituting each GOP is decreased, and each GOP is made to become a closed GOP is used to improve the degree of freedom in random access and edition, an I-Picture, which has a larger number of encoded bits than a P-Picture based on forward prediction and a B-Picture based on bidirectional prediction, appears frequently, resulting in a decrease in encoding efficiency. In general, therefore, there is a trade-off relation between random access/edition manageability and encoding efficiency.

As described above, in MPEG video encoding, if the degree of freedom in random access and cut and past edition is improved by increasing the number of random access points, the encoding efficiency decreases, and the number of encoded bits increases.

BRIEF SUMMARY OF THE INVENTION

It is an object of the present invention to provide a video encoding method and apparatus which allow setting of a random access point at an arbitrary position without any decrease in encoding efficiency, and are suited for random access to encoded data recorded on a recording medium, linking edition of the encoded data, and the like.

According to the present invention, there is provided a video encoding method comprising the steps of, in order to set an intra-coded picture (intra-coded frame) in an encoded picture series (encoded frame series) to a predetermined picture interval (frame interval), and set a random access point, which allows playback from a designated frame, in the encoded picture series, setting an intra-coded picture (intra-coded frame) used for playback from the designated picture (frame) in a picture series in addition to the intra-coded picture (intra-coded frame) inserted in the predetermined picture interval (frame interval), and encoding the intra-coded picture (intra-coded frame) set at the predetermined picture interval (frame interval) and immediately preceding the intra-coded picture (intra-coded frame) set for the random access after switching to motion compensated predictive inter-picture encoding (motion compensated predictive inter-frame coding).

According to this video encoding method, when a random access is to be set at a position different from a cyclic GOP boundary, the cyclic intra-coded frame immediately preceding the random access point is encoded upon switching to the motion compensated predictive inter-frame encoding mode. This can increase the number of frames constituting the GOP immediately preceding the random access point. The encoding efficiency can therefore be increased as compared with the prior art in which the GOP immediately preceding the random access point is terminated at some midpoint, and a GOP having a small number of frames is formed.

The above video encoding method is based on the following principle. In the video encoding method of performing encoding by switching intra-frame encoding and motion compensated predictive inter-frame coding in units of frames, an intra-coded frame is set at a picture series in a predetermined interval. With this operation, encoding is performed while encoded data is divided into encoded frame groups each having a predetermined intra-frame prediction structure. Every time encoding of a currently encoded frame group is complete, it is checked whether a random access point is set to the next frame group. If it is determined that a random access point is set, the inter-frame prediction structure is changed to extend the current encoded frame to the frame immediately preceding the setting position of the random access point.

In this manner, encoding is performed while the inter-frame prediction structure is dynamically changed in accordance with the setting position of a random access. This allows encoding while extending the GOP immediately preceding the random access point and making the random access point coincide with the beginning of a new GOP cycle. This prevents an intra-coded frame from appearing immediately before each random access point in an interval shorter than a normal interval, thereby preventing a decrease in encoding efficiency at each random access point boundary.

In addition, according to the present invention, there is provided a video encoding method comprising the steps of, in order to set an intra-coded frame to the frame series in a predetermined frame interval, and set a random access point which allows playback from a designated frame, set an intra-coded frame used for playback from the designated frame to an encoded frame series in addition to the intracoded frame set at the predetermined frame interval, and when a first encoded frame, other than a bidirectional prediction encoded frame, temporally located immediately before the intra-coded frame inserted for the random access is an intra-coded frame, encoding the intra-coded frame after switching to motion compensated predictive inter-frame coding.

According to this method, the GOP structure immediately preceding a random access can be properly changed. In addition, in consideration of the difference between the encoding order and the display order, which is based on an inter-frame prediction structure, the GOP structure immediately preceding a random access point can be properly changed without any delay, together with control on random access point setting.

This video encoding method is based on the following basic principle. In the video encoding method of performing encoding by switching intra-frame encoding and motion compensated predictive inter-frame coding in units of frames, encoding is performed while encoded data is divided into encoded frame groups each. having a predetermined inter-frame prediction structure by setting an intra-coded frame to an encoded frame series at a predetermined frame interval. It is checked whether the designation position of a random access point which allows playback from an arbitrary frame is temporally located after an intra-coded frame in a predetermined interval in an encoded frame group immediately preceding the set position. If it is determined that the random access point is designated at a position temporally located after the intra-coded frame in the predetermined interval, the immediately preceding frame group is terminated with the frame immediately preceding the random access point. If it is determined that the random access point is set at a position before the intra-coded frame in the predetermined interval, the immediately preceding encoded frame group is extended to the frame immediately preceding the random access point.

With the application of this principle, the difference between the input order of a video-signal and the encoding order can be used, and prediction structure change control can be performed by checking a random access point boundary and encoded picture type without detecting a random access in the forward direction.

In addition, according to the present invention, the random access point is set by at least one of the following methods: (1) designating the point by using a time code; (2) designating the point by detecting a scene change of input video; and (3) designating the point in read time during encoding.

Method (1) allows accurate, appropriate setting of a random access point in units of frames. In general, a scene change is important as an access unit, and hence method (2) allows automatic, appropriate setting of a random access point in accordance with a scene change. Method (3) allows the user to arbitrarily set an access point in real time while watching video to be encoded.

Furthermore, a recording medium on which data encoded by the present invention is recorded facilitates implementation of random access to a point desired by the user, linking edition of encoded data in units of random access points, and the like without any deterioration in picture quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are views for explaining an inter-frame prediction structure used in the first embodiment;

FIGS. 3A to 3D are views comparing a random access point setting method used in the first embodiment with conventional methods;

FIGS. 4A and 4B are views for explaining the difference between the input order and the encoding order in an encoding scheme used in the first embodiment;

FIGS. 5A and 5B are views showing a random access point setting method used in the first embodiment in consideration of the difference between the input order and the encoding order;

FIGS. 6A to 6F are views showing examples of random access point setting used in the first embodiment;

FIGS. 8A to 8F are views showing the first example of random access point setting according to the second embodiment of the present invention;

FIGS. 9A to 9E are views showing the second example of random access point setting according to the second embodiment of the present invention;

FIGS. 10A to 10D are views showing the third example of random access point setting according to the second embodiment of the present invention;

Figures 11A, 11B, 11C, 11D, 11E:
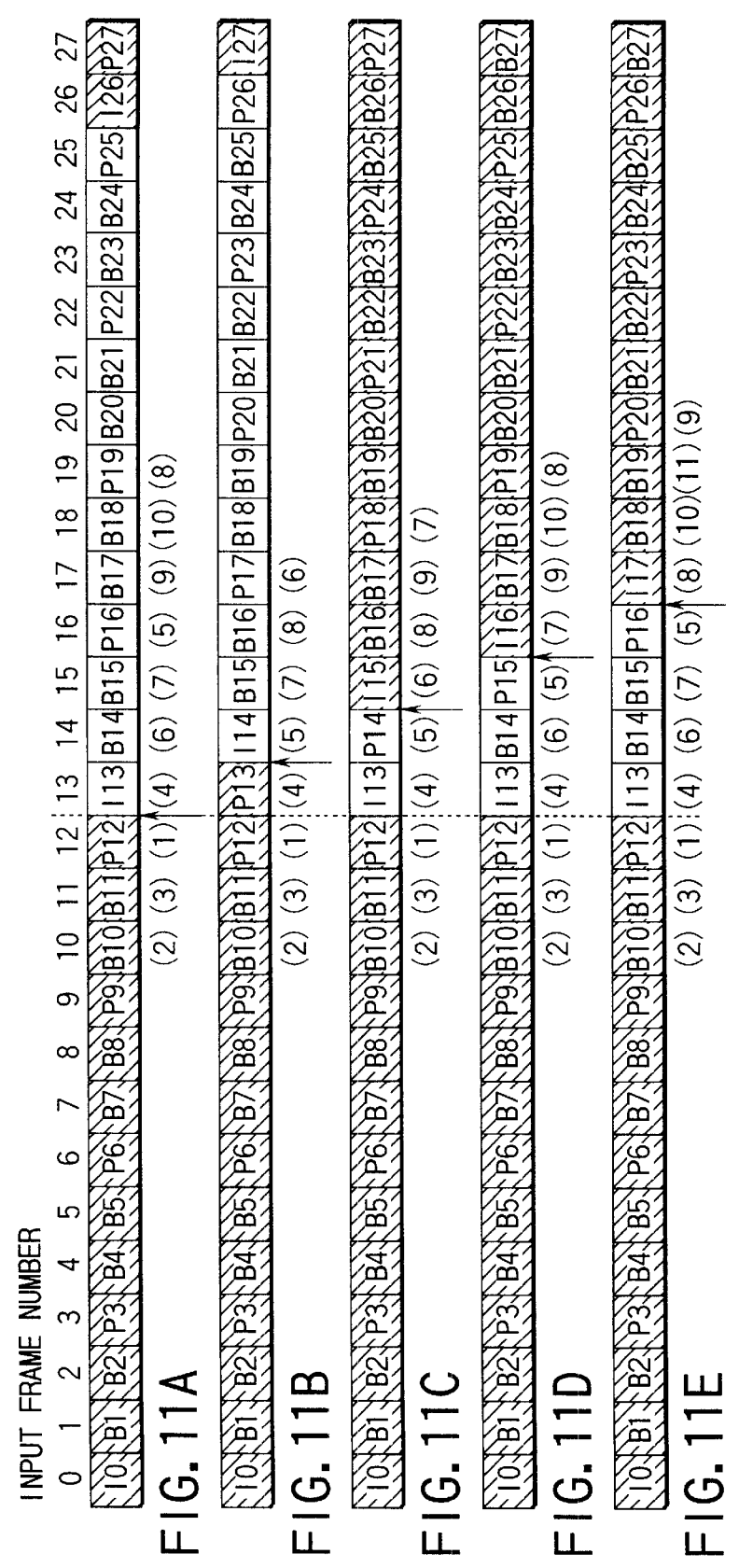

FIGS. 11A to 11E are views showing the fourth example of random access point setting according to the second embodiment of the present invention;

FIGS. 12A to 12D are views showing the fifth example of random access point setting according to the second embodiment of the present invention;

FIGS. 14A and 14B are views showing a random access point setting method according to the second embodiment in consideration of the difference between the input order and the encoding order.

DETAILED DESCRIPTION OF THE INVENTION

Embodiments of the present invention will be described below to the with reference to the views of the accompanying drawings.

Figure 1:
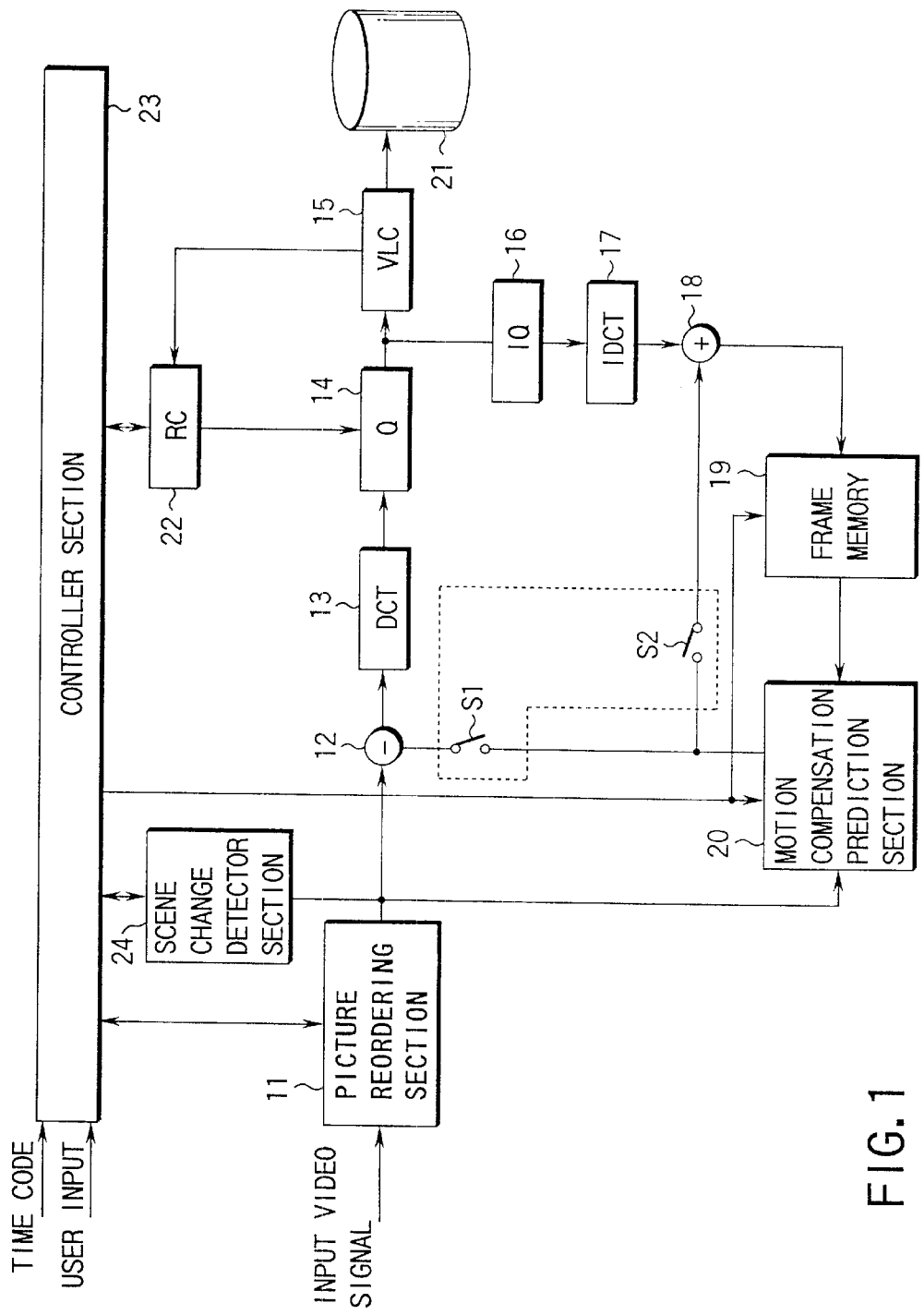
FIG. 1 is a block diagram showing a video encoding apparatus according to the first embodiment of the present invention.

According to the first embodiment shown in FIG. 1, a video encoding apparatus has an intra-frame encoding mode (INTRA) and a motion compensated predictive interframe coding mode (INTER) and is designed to control the encoding modes in units of frames.

An input video signal 10 is input first to a picture reordering section 11, in which the pictures are reordered in the encoding order in accordance with the picture types (I-Picture, B-Picture, and P-Picture) in encoding. This reordering is performed because prediction encoding for a B-Picture is performed by referring to temporally preceding and succeeding pictures. The picture reordering section 11 has a frame memory and reorders the pictures through the frame memory. Each of the input pictures reordered in the encoding order is divided into 8×8-pixel blocks and encoded in units of blocks.

When the motion compensated predictive inter-frame coding mode is set, a motion compensated prediction section 20 performs motion detection processing, i.e., performing motion detection by using a local decoded picture stored in a frame memory (FM) 19 as a reference picture, thereby obtaining a prediction video signal. A subtractor 12 obtains the difference between this prediction video signal and the input video signal as a motion compensated predictive error signal. The motion compensated predictive error signal is input to a DCT (discrete cosine transform) section 13.

When the intra-frame encoding mode is set, a switch S1 is turned off to input the input video signal to the DCT section 13 without any change.

The DCT section 13 performs DCT operation in units of 8×8-pixel blocks. The resultant DCT coefficients are quantized by a quantizer (Q) 14. The quantized data are variable-length-encoded by a variable length coder (VLC) 15. The resultant data is recorded, as encoded data multiplexed with attendant information such as motion vectors, in a storage medium 21. The video encoding apparatus of this embodiment may be designed to directly output the encoded data to a transmission line.

To obtain a local decoded picture, an inverse quantizer (IQ) 16 and an inverse DCT section (IDCT) 17 perform inverse quantization and the inverse DCT for the quantized DCT coefficients in a reverse procedure to that followed by the quantizer (Q) 14 and the DCT section 13. In the motion compensated predictive inter-frame coding mode, an adder 18 adds the picture signal having undergone inverse quantization and the inverse DCT to the prediction video signal input through a switch S2. The local decoded picture obtained in this manner is stored in a frame memory 19.

A rate controller section (RC) 22 controls the quantizer scale of the quantizer (Q) 14 in units of macroblocks to set a predetermined encoding rate in accordance with the number of encoded bits of encoded data from the VLC 15. A controller section 23 is a CPU or a processor such as a DSP, and controls the overall encoding operation.

In this embodiment, control on an inter-frame prediction structure and picture types (I-Picture, B-Picture, and P-Picture), which is performed to determine a GOP structure, is performed in accordance with instructions from the controller section 23. More specifically, the controller section 23 controls the picture reordering section 11 in accordance with an inter-frame prediction structure and picture types, and also instructs the motion compensated prediction section 20 to encode a specific frame by using a specific frame as a reference picture. In addition, the controller section 23 controls the switches SI and S2 to switch the encoding modes so as to perform intra-frame coding or motion compensated predictive inter-frame coding.

An inter-frame prediction structure and picture types (I-Picture, B-Picture, and P-Picture) are basically controlled in units of GOPs by setting an I-Picture in a frame series at a predetermined interval. However, to allow setting of a random access point at an arbitrary frame position, the GOP structure is dynamically changed in accordance with the random access point setting position. The GOP structure is changed such that the GOP length immediately preceding the random access point is extended to a frame immediately preceding the random access point, and the new GOP interval, with a closed GOP as a beginning, starts from the random access point.

A random access point is designed by the following methods.

(1) A random access point setting position is designated by using a time code indicating the temporal position of an input frame. The time code is input by being superposed as VITC on a video signal output from a video input apparatus such as a VCR (video cassette recorder) in a vertical blanking period or input through a dedicated signal line.

(2) A scene change of an input video is detected by a scene change detector section 24, and a random access point setting position is automatically designated by using the detected point.

(3) An input video is encoded while being played back, and the user designates a random access point during encoding in real time.

By using method (1), a random access point can be accurately and appropriately inserted in units of frames. In general, a scene change point is important as an access unit, an appropriate random access point can be automatically inserted in accordance with a scene change by using method (2) By using method (3), the user can arbitrarily set an access point in real time while watching video to be encoded.

FIGS. 2A and 2B show inter-frame prediction structures associated with MPEG video encoding.

Referring to FIGS. 2A and 2B, reference symbol I denotes an intra-coded picture (I-Picture); P, a forward predictive coded picture (P-Picture), and B, a bi-directional predictive coded picture (B-Picture). Each arrow in FIGS. 2A and 2B indicates a prediction structure directed from a reference picture to an encoded picture. In general, an I-Picture is set every 10-odd frames, and each GOP is made up of 10-odd frames. If, therefore, the number of frames constituting a GOP decreases, the occurrence ratio of I-Pictures to B-Pictures and P-Pictures increases. An I-Picture is encoded without using any inter-frame correlation and hence generally demands a larger number of bits than a P-Picture or B-Picture.

That is, as the ratio of I-Pictures increases, the encoding efficiency decreases. In contrast to this, as the intervals at which I-Pictures are set increase, the encoding efficiency increases. This increase in encoding efficiency, however, eventually saturates.

In addition, computation errors associated with the inverse DCT between the encoding apparatus and the decoding apparatus cause differences between reference pictures on the encoding side and the decoding side.

The resultant errors are accumulated in reference pictures in the decoding apparatus. This may cause a distortion of a decoded picture. When an error occurs in encoded data on a transmission line, the resultant disturbance of a picture propagates to succeeding pictures as long as inter-frame prediction pictures continue. The influence of this error cannot be eliminated until the next correct I-Picture appears.

In general, in consideration of the balance between these factors, an I-Picture is periodically set at a frame series at about 0.5-sec intervals.

As a GOP structure, either the structure in FIG. 2A, in which prediction is performed across GOPs, or the structure in FIG. 2B, in which prediction is not performed across GOPs, is used.

The structure in FIG. 2B corresponds to the closed COP described above. When the closed GOP is used, the B-Pictures preceding the I-Picture of each GOP are encoded by only backward prediction, but forward prediction from the immediately preceding GOP is inhibited. For this reason, with the use of the closed GOP, the encoding efficiency decreases as compared with the structure in FIG. 2A, and the picture quality deteriorates at the same encoding rate.

Consider the structure in FIG. 2A. When, for example, playback is to be started from GOP 2, since the B-Pictures preceding the I-Picture of GOP 2 are encoded by referring to GOP 1, correct decoding is difficult to perform. Obviously, there is a trade-off relation between random access manageability and encoding efficiency.

FIGS. 3A to 3D give comparisons between conventional random access point setting methods and a random access point setting method of this embodiment.

FIGS. 3A to 3C show the conventional methods. FIG. 3A shows the random access point setting method of encoding all GOPs as closed GOPs to allow random access to each GOP. In this case, the encoding efficiency greatly decreases owing to the closed GOPs. In addition, according to the method shown in FIG. 3A, since the setting interval of I-Pictures as random access points is fixed, it is difficult to set a random access point at an arbitrary frame position in accordance with, e.g., an instruction from the user.

In the methods shown in FIGS. 3B and 3C, only a portion designated as a random access point is encoded as a closed GOP, and an immediately preceding GOP is formed in accordance with the access point position, thereby reducing the number of frames.

That is, the method shown in FIG. 3B is a method of dividing GOP 3 in FIG. 3A into two GOPs, i.e., GOP 3 and closed GOP 4. Both the numbers of frames contained in GOP 3 and closed GOP 4 are smaller than those of other normal GOPs. FIG. 3C shows the method of terminating GOP 3 at some midpoint and starting a new GOP interval with closed GOP 4.

In either of the methods shown in FIGS. 3B and 3C, the number of frames constituting a GOP immediately preceding each random access point becomes smaller than that of each of the normal GOPs. In general, therefore, the interval between I-Pictures is shortened immediately before each random access point, and the encoding efficiency decreases for the above reason.

In this embodiment, as shown in FIG. 3D, the number of frames constituting the GOP (corresponding to GOP 2 in FIG. 3D) immediately preceding a random access point is increased to prolong its end position to the frame immediately preceding the random access point, and a new GOP interval is started with closed GOP 3 from the random access point. This method can prevent a decrease in encoding efficiency due to a decrease in the interval between I-Pictures.

FIGS. 4A and 4B show the difference between the input order of frames and the encoding order of frames in MPEG video encoding.

FIG. 4A shows the input order of frames. FIG. 4B shows the encoding order of frames. Referring to FIGS. 4A and 4B, each range enclosed with a dotted line indicates one GOP, and the numerals suffixed to picture types B, I, and P are the frame numbers of the corresponding input frames. In the following description, a frame having a frame number n which is encoded as picture type B is written as Bn, a frame having the frame number n which is encoded as picture type I is written as In, and a frame having the frame number n which is encoded as picture type I is expressed as Pn.

As described above, in MPEG, since backward prediction is performed for B-Pictures, an I-Picture or P-Picture used as a reference picture is encoded before the B-Picture. Thereafter, the B-Pictures located between I-Pictures or P-Pictures are encoded. For this reason, the input order of frames (which coincides with the display order) differs from the encoding order of frames, as shown in FIGS. 4A and 4B.

In the case shown in FIGS. 4A and 4B, since frames B0 and B1 to be encoded as B-Pictures are subjected to backward prediction from a frame I2 to be encoded as an I-Picture, the encoding order becomes frames I2, B0, and B1. In addition, since frames B3 and B4 to be encoded as B-Pictures are encoded by backward prediction from a frame P5 to be encoded as a P-Picture, the frame P5 is encoded before the frames B3 and B4. That is, a dynamic change in GOP structure accompanying the above random access point setting processing must be made in accordance with this encoding order control.

FIGS. 5A and 5B show examples of how the GOP structure is changed to set a random access point at a frame B19 to be encoded as a B-Picture in the input video in FIG. 4A by using the method of this embodiment.

FIGS. 5A and 5B respectively show the input order of frames and the encoding order of the frames. In this case, the frame to be encoded first in the GOP to which the frame B19 belongs, i.e., the encoded picture type of the frame I14 located at the start of the encoding order, is replaced with P-Picture, as shown in FIGS. 5A and 5B. With this operation, this frame is encoded as a P-Picture to become a frame P14. As a result, the GOP that ends with a frame P11 in FIGS. 4A and 4B is extended to a frame immediately preceding the frame B19 in the display order, as shown in FIGS. 5A and 5B. Note that frame P14 in FIGS. 5A and 5B is subjected to forward prediction from the frame P11.

According to the MPEG specifications, each GOP must always end with a P-Picture or I-Picture in the display order. For this reason, the encoded picture type of a frame B18 is changed to a P-Picture in FIGS. 4A and 4B so as to set P-Picture as the picture type of the frame immediately preceding the frame B19 serving as a random access point. With this operation, as shown in FIGS. 5A and 5B, a frame immediately before the frame B19 is the frame P18 to be encoded as a P-Picture.

In addition, to start a GOP from the frame B19 serving as a random access point, the frame B21 in FIGS. 4A and 4B is encoded as the frame I21 to be encoded as an I-Picture, and forward prediction for the frames B19 and B20 is inhibited to set the GOP starting with the frame B19 as a closed GOP.

In this manner, control operation is performed to inhibit any I-Picture from appearing in a predetermined interval immediately preceding a designated random access point, thus preventing a decrease in encoding efficiency at the random access point.

A method of GOP structure control accompanying random access point setting processing according to this embodiment will be described next with reference to FIGS. 6A to 6F.

The point indicated by the arrow in FIGS. 6A to 6F is a random access point as an editable point. The numbers inside the parentheses indicate the encoding order of several consecutive input frames.

In the case shown in FIGS. 6A to 6F, as described with reference to FIG. 3D, the GOP immediately preceding the random access point is extended to a position immediately preceding the random access point, the beginning of a closed GOP is aligned with the random access point, and a new GOP cycle starts with the closed GOP. Note that as a GOP prediction structure, a structure expressed as "B, B, I, B, B, P, B, B, P, B, B, P", in which B-Pictures are arranged before an I-Picture in the display order, is used.

Figures 6A, 6B, 6C, 6D, 6E, 6F:
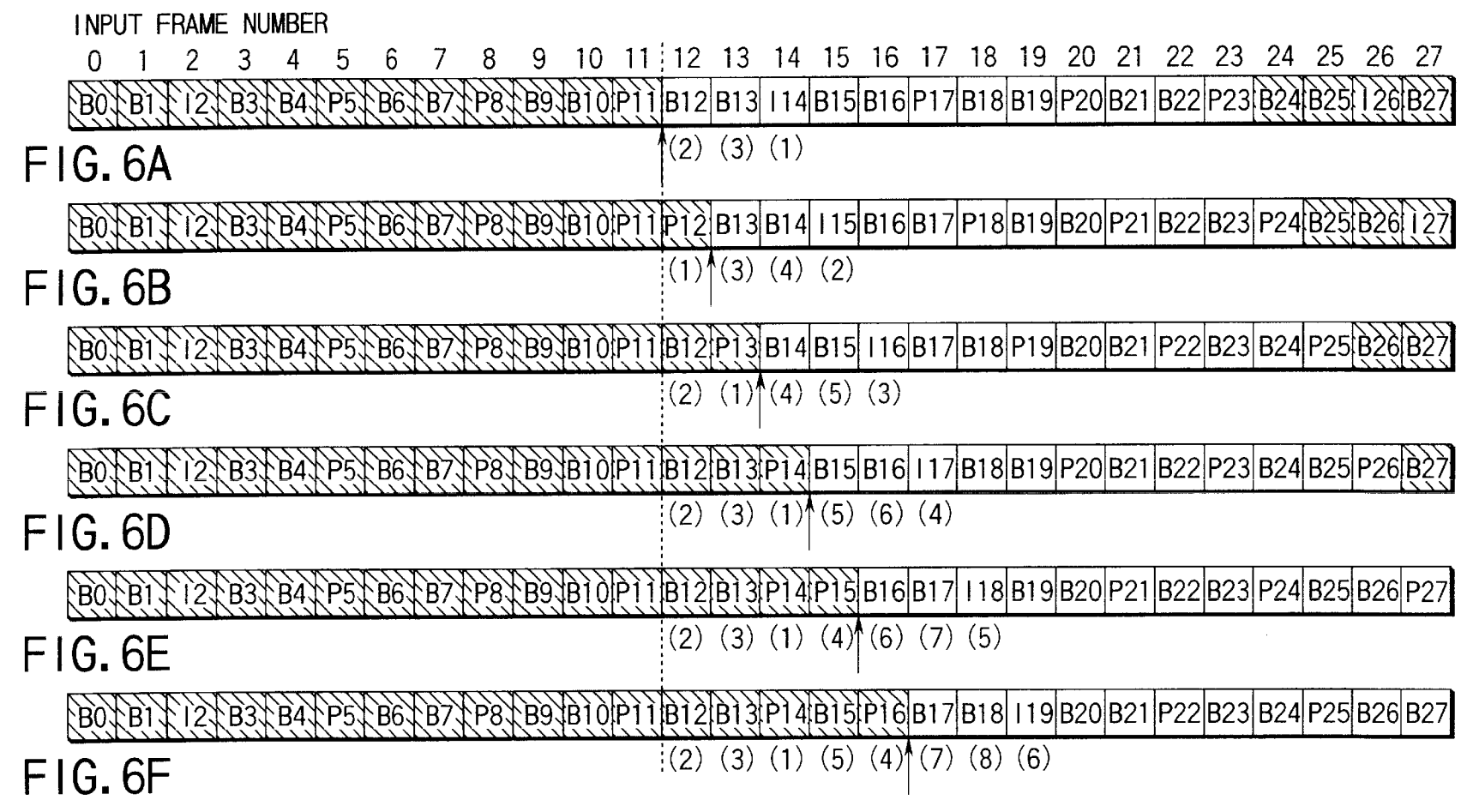

FIG. 6A shows a case wherein the demodulated signal boundary coincides with the random access point. In this case, the GOP structure is not changed, and only forward prediction inhibition processing is performed for the B-Picture at the beginning of each GOP to make the GOP immediately preceding the random access point become a closed GOP.

As shown in FIG. 6B, when a random access point is to be set at a frame B13 to be encoded as a B-Picture in FIG. 6A, the picture type of a frame B12 immediately preceding the random access point is changed to P, and this frame is encoded as a frame P12. The frame P12 is set as the last frame of the GOP immediately preceding the random access point. A new GOP interval starts with the frame immediately succeeding the random access point. As a result, frames 13, 14, 15, ... become frames B13, B14, I15, ..., having picture types B, B, I, ... The frame I15 is an I-Picture newly inserted to set a random access point. Forward prediction inhibition processing is performed for the B-Pictures at the beginning of the GOP immediately succeeding the random access point, i.e., the frames B13 and B14, to make the GOP become a closed GOP. Similar processing is performed in both the cases shown in FIGS. 6C and 6B.

As shown in FIG. 6D, when a random access point is to be set to the frame B15 to be encoded as a B-Picture in FIG. 6A, the picture type of the frame 14 immediately preceding the random access point is changed from I to P and is encoded as the frame P14. In addition, similar to the cases in FIGS. 6B and 6C, forward prediction inhibition processing is performed for the B-Pictures at the beginning of the GOP, i.e., the frames B15 and B16 to make a GOP immediately succeeding the random access point become a closed GOP.

When a random access point is to be set to the frame B16 to be encoded as a B-Picture in FIG. 6A, the picture type of the frame 14 that is an I-Picture immediately preceding the random access point is changed from the I-Picture to the P-Picture, and the picture type of the frame 15 is changed as a P-Picture to be encoded as the frame P15. The frame P15 is set as the last frame of the GOP immediately preceding the random access point. As in the case shown in FIG. 6D, to make the GOP immediately succeeding the random access point become a closed GOP, forward prediction for the B-Pictures at the beginning of the GOP, i.e., the frames B16 and B17, is inhibited.

The structure shown in FIG. 6F is processed in the same manner as the structure shown in FIG. 6E.

According to each of the GOP structures in FIGS. 6B to 6F, since the I-Picture contained in the GOP having a small number of frames as shown in FIG. 3B or 3C and immediately preceding the random access point is encoded as a P-Picture, the shortening of the setting intervals of I-Pictures can be prevented, and hence a decrease in encoding efficiency can be prevented.

Considering the frame 14 to be encoded as an I-Picture in a predetermined interval, it is apparent that the encoded picture type is replaced with motion compensated predictive inter-frame coding, as indicated by the frame B14 in FIG. 6B, the frame B14 in FIG. 6C, the frame P14 in FIG. 6D, the frame P14 in FIG. 6E, and the frame P14 in FIG. 6F. That is, in the GOP structure control method shown in FIGS. 6A to 6F, control is performed such that an I-Picture (I14) in a predetermined interval immediately preceding an I-Picture (frame I15 in FIG. 6B, frame I16 in FIG. 6C, frame I17 in FIG. 6D, frame I18 in FIG. 6E, and frame I19 in FIG. 6F) set to allow random access from an arbitrarily designated position is encoded after replaced with a B-Picture or P-Picture.

Figure 7:
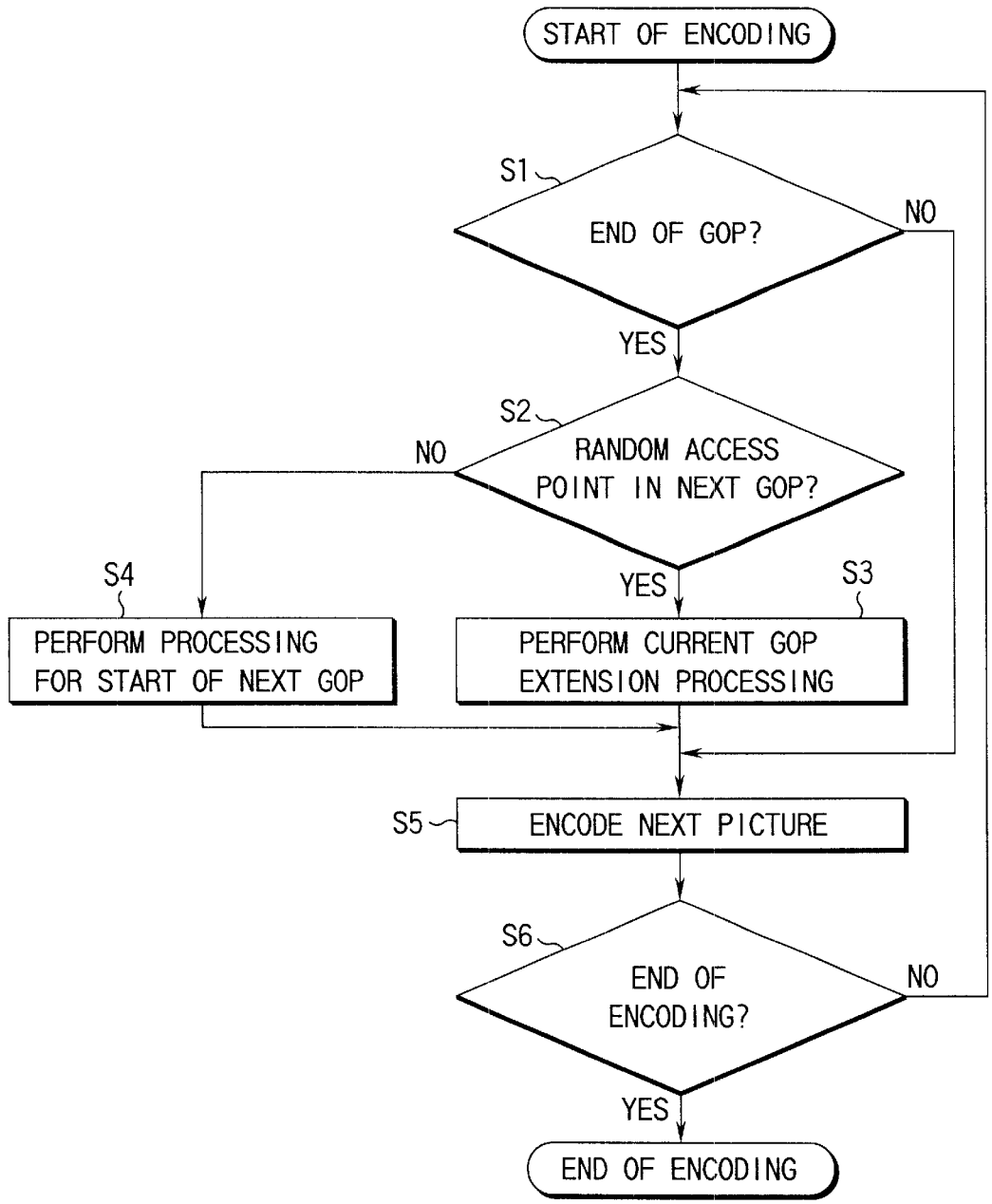
FIG. 7 is a flow chart showing an encoding procedure used in the first embodiment.

FIG. 7 is a flow chart showing a procedure for encoding in this embodiment.

In this embodiment, encoding is performed under the control of the controller section 23, and a random access point can be arbitrarily set to a frame series on the basis of access point designation using a time code, access point designated based on scene change detection, or access point designation from the user, while encoding is performed in units of GOPs by setting I-Pictures to the frame series at a predetermined interval.

First of all, at the end of encoding of each GOP loaded from, e.g., a storage medium in a predetermined interval (step 1), it is checked whether a random access point is designated in the next normal GOP (step 2). If it is determined that a random access point is designed in the next GOP, current COP extending processing is performed to increase the number of frames constituting the current GOP (step 3). In this current GOP extending processing, the picture type of the frame to be encoded next in the encoding order is changed from I to P (or B), and the encoding order, i.e., the order of the frames to be encoded, is changed upon this change in picture type.

In the case shown in FIGS. 6A to 6F, at the end of encoding of the frame having frame number 10, i.e., frame B10 whose picture type is B, encoding of the GOP corresponding to this frame is terminated. The frame to be encoded first in the next GOP is therefore the frame 14 whose picture type is I, and the picture type of the frame 14 is changed to P (or B), as described above. In addition, the picture type of the frame immediately preceding the random access point is changed as a P-Picture to become the final frame of the extended GOP. Upon this change in picture type, the frame 14 in FIGS. 6B to 6F becomes a frame that is not to be encoded next, and encoding is performed in the order of the numbers in the parentheses in FIGS. 6B to 6F, i.e., 1, 2, 3, . . . (step 5).

When encoding of the frame corresponding to the set random access point is complete, a new GOP interval starts with th e access point. In this case, to make the GOP immediately succeeding the random access point become a closed GOP, forward prediction is inhibited if a B-Picture is present at the beginning of the GOP in the display order.

If no random access point is set to the next GOP, the beginning frame of a GOP and an I-Picture are set as in normal operation to start the next normal GOP interval (step 4).

In this manner, while encoding is performed in units of GOPs by setting I-Pictures to a frame series at a predetermined interval, it is checked at the end of encoding of each GOP whether a random access point is set in the next GOP. If a random access point is. set, GOP structure change control is performed, i.e., preventing any I-Picture from appearing from the immediately pre ceding GOP to the random access point so as to extend the current GOP length to a position immediately preceding the random access point.

With the execution of GOP structure change control immediately preceding the random access point in the above manner, no GOP having a smaller number of frames is inserted in a GOP series immediately before the random access point, thus preventing a decrease in encoding efficiency.

According to the flow of processing in FIG. 7, whether to extend the current GOP length is determined by checking in step 2 whether a random access point is set to the next GOP. The GOP length immediately before a random access point corresponds to twice the number of frames of a normal GOP at maximum. In the present invention, however, there is no limitation on the number of frames succeeding the current frame in checking whether a random access point is set. Therefore, a range in which the presence/absence of random access point is checked ahead of the current frame can be set in accordance with the maximum number of frames constituting a GOP.

More specifically, in step 2 in FIG. 7, the presence/absence of a random access point may be checked up to a position succeeding the current frame by the number of frames corresponding to the difference between a predetermined maximum GOP length and a normal GOP length. In this case, the maximum GOP length immediately before a random access point becomes equal to the maximum GOP length.

GOP structure change processing will be described next as the second embodiment of the present invention.

FIGS. 8A to 12D show examples of how GOP[]structure change control is performed upon random access point setting in the second embodiment, including the picture types in the display order. The points indicated by the arrows in FIGS. 8A to 12D indicate random access points as editable points.

In this case, control operations are switched depending on whether a random access point is set to the first I-Picture or a preceding frame in a GOP in the display order or not. More specifically, when a random access point is set to the first I-Picture or a preceding frame in a GOP in the display order, the GOP immediately preceding the random access point is extended. In contrast to this, when a random access is inserted in a frame succeeding the frame of the first I-Picture, the GOP is terminated at a position immediately preceding the random access point, and a GOP shorter than the normal GOP is inserted in the GOP series.

FIGS. 8A to 8F show a case wherein an I-Picture or P-Picture appears in an interval of three frames (M=3). The points indicated by the arrows in FIGS. 8A to 8F are random access points as editable points, and the numbers inside the parentheses indicate the encoding order of consecutive input frames.

Figures 8A, 8B, 8C, 8D, 8E, 8F:
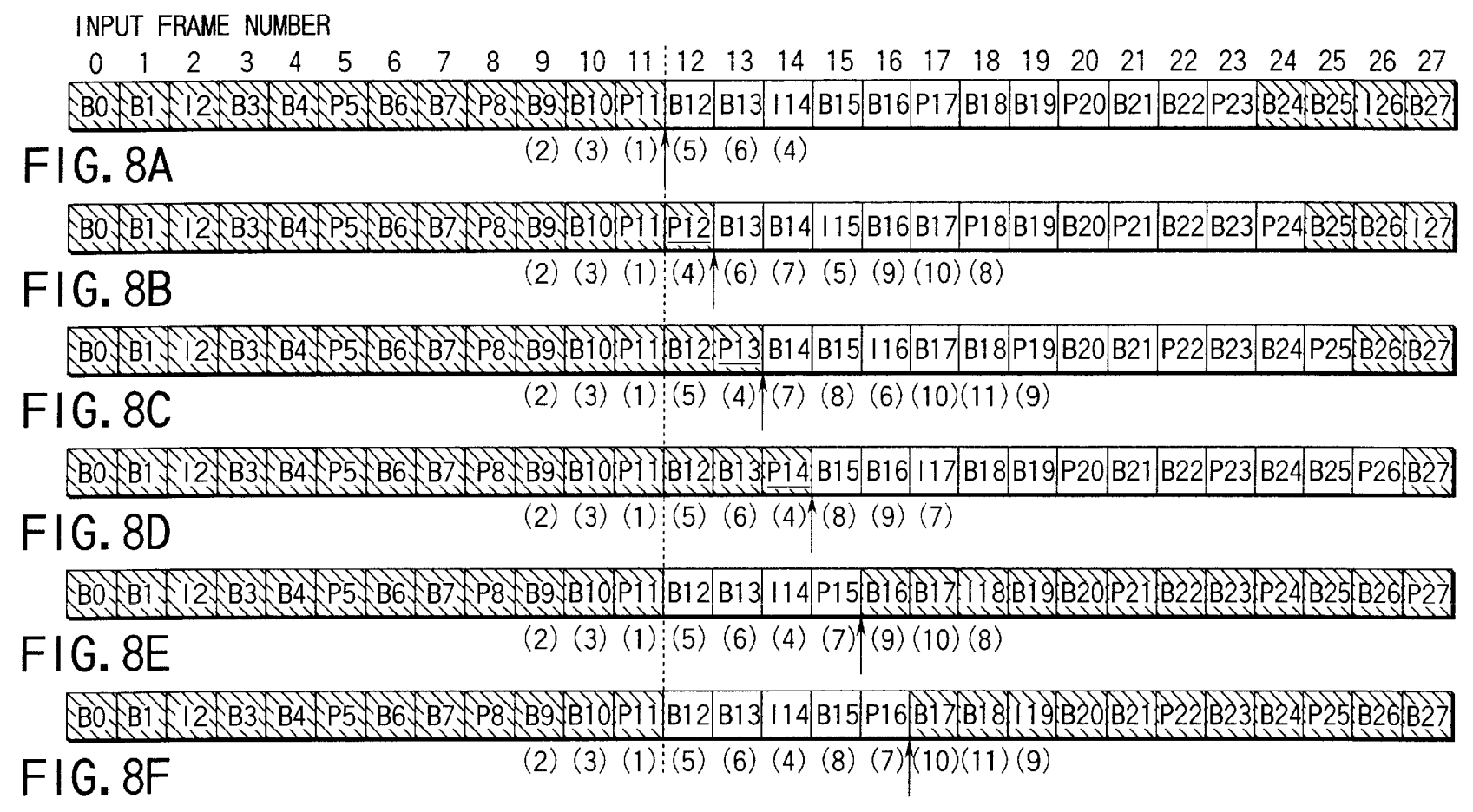

FIG. 8A shows a case wherein a GOP boundary coincides with the random access point. In this case, the GOP structure is not changed, and only forward prediction inhibition processing is performed for the B-Pictures at the beginning of the GOP immediately succeeding the random access point to make the GOP become a closed GOP.

FIG. 8B shows a case wherein a random access point is set immediately after the first frame of a GOP in the display order. In this case, as shown in FIG. 6B in the first embodiment, this first frame is encoded as a P-Picture, and the GOP structure is changed such that this P-Picture becomes the last frame of the GOP immediately preceding the random access point. In addition, to start a GOP immediately after the random access point, the frame 15 encoded as a B-Picture in FIG. 8A is encoded first as the frame I15 which is an I-Picture, and the frame 14 as an I-Picture is changed to a B-Picture. Furthermore, to make the GOP: immediately succeeding the random access point become a closed GOP, forward prediction is inhibited for the B-Pictures at the beginning of the GOP, i.e., frames B13 and B14.

The GOP structures of the pictures in FIGS. 8C and 8D are also changed in the same manner as those in FIGS. 6C and 6D in the first embodiment.

As shown in FIGS. 8E and 8F, when a random access point is set at a position located three frames or more, which correspond to the interval between I-Pictures or P-Pictures in a GOP, ahead of the beginning of the GOP in the display order, a new GOP having a smaller number of frames than the normal GOP immediately preceding the random access point is formed instead of extending the immediately preceding GOP as shown in FIGS. 8A to 8C.

In the GOP structure control method of the second embodiment, control is performed differently depending on whether the picture type of the first frame, except for a B-Picture, temporally located immediately before an I-Picture (frame I15 in FIG. 8B, frame I16 in FIG. 8C, frame I17 in FIG. 8D, frame I18 in FIG. 8E, and frame I19 in FIG. 8F) inserted to allow random access from an arbitrarily designated position is I-Picture or not. If the picture type is I, the picture type is changed to P or (B).

For example, in the case in FIG. 8B, since the frame position where an I-Picture is inserted: to allow random access corresponds to the frame 15 (I15), and the picture type of the frame, other than a B-Picture, immediately preceding the I-Picture is the I-Picture of the frame 14 in FIG. 8A, the picture type of the frame 14 is changed.

In the case in FIG. 8C, the frame position where an I-Picture is set to allow random access corresponds to the frame 16 (I16), and the frame 15 is a B-Picture as shown in FIG. 8A, the frame B15 is ignored, and the picture type of a frame, other than a B-Picture, immediately preceding frame 16 is the I-Picture of the frame 14 in FIG. 8A. Therefore, the picture type of the frame 14 is changed to B.

Similarly, in the case in FIG. 8D, since the frame in which an I-Picture is set to allow random access is the frame 17 (I17), and the frames 16 and 15 are B-Pictures as shown in FIG. 8A, these B-Pictures are ignored, and the picture type of a frame other, other than a B-Picture, immediately preceding frame 16 is the I-Picture of the frame 14 in FIG. 8A. Therefore, the picture type of the frame 14 is changed.

In the case in FIG. 8E, the frame in which an I-Picture is set to allow random access is the frame 18 (I18). Since a frame 17 is a P-Picture as shown in FIG. 8A, the picture type of the frame 14 is not changed, and the frame 14 is encoded as an I-Picture. That is, a short GOP is constituted by frames B12, B13, I14, and P15.

Similarly, in the case in FIG. 8F, the frame in which an I-Picture is inserted to allow random access is the frame 19 (I19). Since the picture type of a frame, other than a B-Picture, immediately preceding frame 19 is the P-Picture of the frame 17 as shown in FIG. 8A, the picture type of the frame 14 is not changed, and the frame 14 is encoded as an I-Picture. That is, a short GOP is constituted by frames B12, B13, I14, B15, and P16.

In this manner, when a random access point is inserted in the I-Picture or a preceding frame in a GOP in the display order, the GOP length immediately before the random access point is extended. When the setting position of a random access point is located after the I-Picture in a GOP in the display order, a new GOP having a smaller number of frames than a normal GOP is inserted in the GOP series.

FIGS. 9A to 9E show examples of how GOP structure control is performed in the second embodiment when an I-Picture or P-Picture appears in an interval of two frames (M=2).

Figures 9A, 9B, 9C, 9D, 9E:
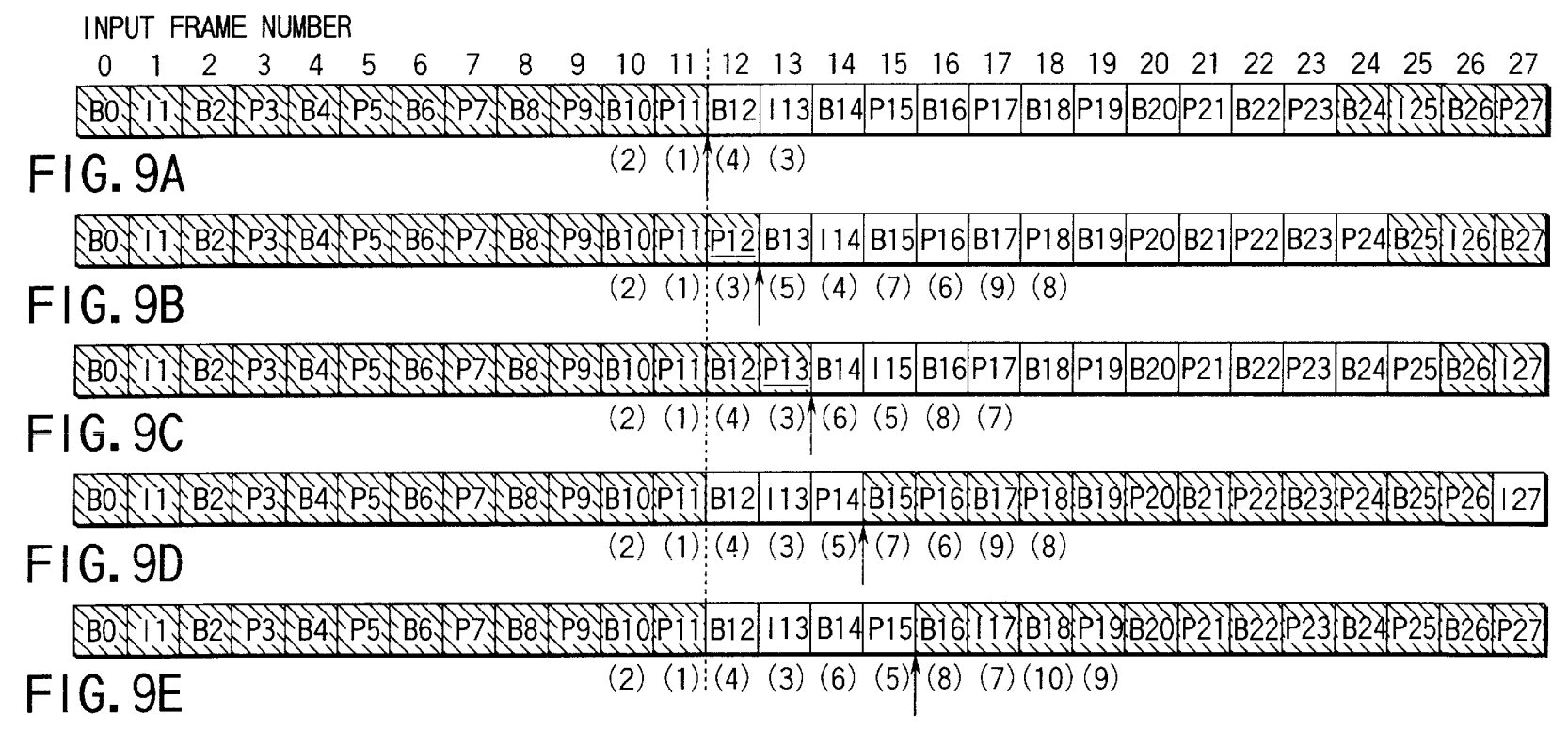

FIG. 9A shows a case wherein a GOP boundary coincides with the random access point. In this case, the GOP structure is not changed, and only forward prediction inhibition processing is performed for the B-Pictures at the beginning of the GOP immediately preceding the random access point to make the,.GOP become a closed GOP.

In each of the cases shown in FIGS. 9B and 9C, since a random access point is located before the I-Picture in a GOP in the display order, the immediately preceding GOP is extended by making the frame immediately preceding the random access point become a P-Picture. In each of the cases shown in FIGS. 9D and 9E, since the setting position of a random access point is located two frames or more, which correspond to the interval of I-Pictures or P-Pictures, ahead of the beginning of the GOP, the immediately preceding GOP is not extended, but a short GOP having a length corresponding to the interval between the end of the immediately preceding GOP and the random-access point is inserted in the GOP series.

FIGS. 10A to 10D show cases wherein the interval in which an I-Picture or P-Picture appears is one frame (M=1), i.e., no B-Picture is used.

Figures 10A, 10B, 10C, 10D:
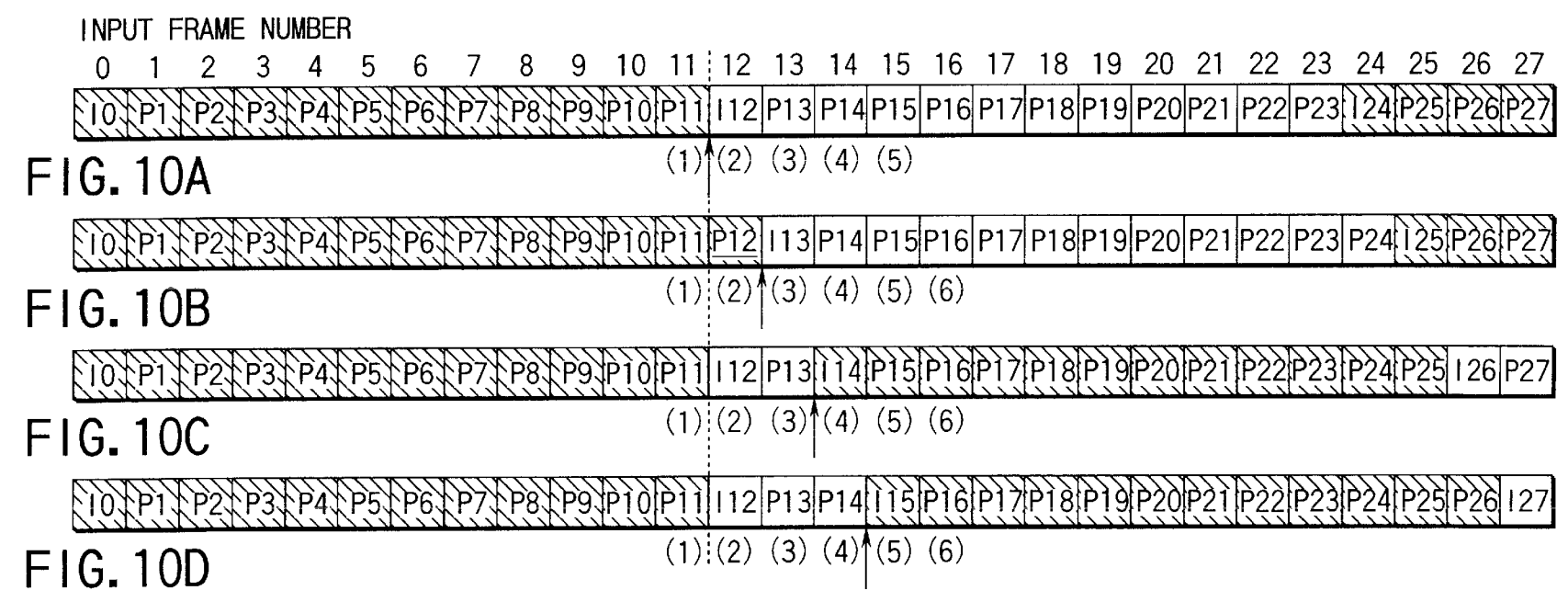

FIG. 10A shows a case wherein a GOP boundary coincides with the random access point. In this case, the GOP structure is not changed. In addition, since no B-Picture is used, the GOP immediately preceding the random access point can be made to become a closed GOP without performing forward prediction inhibition processing for B-Pictures.

In the case shown in FIG. 10B, since a random access point is located after the frame I12 as an I-Picture in the GOP in the display order, the GOP immediately preceding the random access point is extended by making the frame immediately preceding the random access point, i.e., the frame I12 in this case, become a P-Picture. In addition, the frame P13 immediately succeeding the random access point is encoded as the frame I13 which is an I-Picture.

In each of the cases shown in FIGS. 10C and 10D, since the setting position of a random access point is located more than one frame, which is the interval of I-Pictures or P-Pictures, ahead of the beginning of the GOP in the display order, the GOP immediately preceding the random access point is not extended, but only encoding of the frame P14 immediately preceding the random access point as the frame I14 which is an I-Picture is performed. A short GOP constituted by the frames I12 and P13 is set immediately before the random access point.

Each of FIGS. 11A to 11E shows an example of how GOP structure control is performed when an I-Picture or P-Picture appears in an interval of three frames (M=3), and no B-Picture is used before the I-Picture at the beginning of each GOP. In the case shown in FIG. 11B, the GOP is extended. In each of the cases shown in FIGS. 11C to 11E, a short GOP is formed.

Each of FIGS. 12A to 12D shows an example of how GOP structure control is performed when an I-Picture or P-Picture appears in an interval of two frames (M=2), and no B-Picture is used before the I-Picture at the beginning of each GOP in the display order. In the case shown in FIG. 12B, the GOP is extended. In each of the cases shown in FIGS. 12C and 12D, a short GOP is formed.

Figure 13:
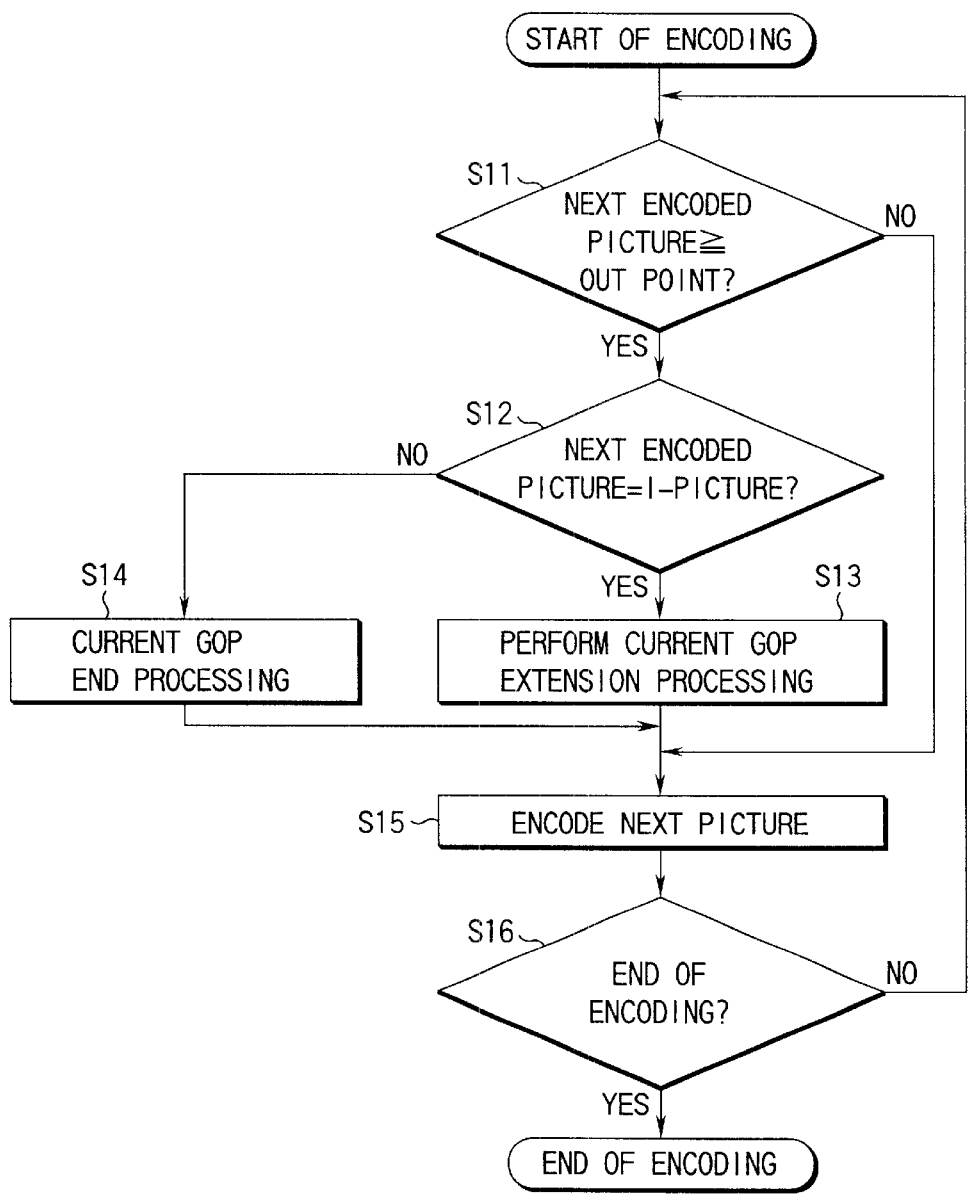
FIG. 13 is a flow chart showing an encoding procedure used in the second embodiment.

FIG. 13 is a flow chart showing an encoding procedure in the second embodiment.

In the second embodiment, it is checked immediately before encoding of each frame whether the frame to be encoded next in the encoding order is a frame after a frame (to be referred to as an OUT point hereinafter) immediately preceding a random access point, in the display order, set on the basis of access point designation using a time code, random access point designation based on scene change detection, random access point designation from the user during encoding, or the like (step 11).

If the next frame to be encoded is located before the OUT point in the display order, encoding is performed in accordance with a prediction structure as in normal operation (step 15).

If it is determined that the next frame is located at or after the OUT point in the display order, it is checked whether the encoded picture type of the next frame is I (step 12). If it is determined that the next picture is an I-Picture, the current GOP is extended (step 13). In this current GOP extension processing, the picture type of the frame to be encoded next in the display order is changed from I to P (or B), and the encoding order, i.e., the order of frames to be encoded, is changed, as needed, in accordance with this change in picture type. This operation corresponds to, for example, the cases shown in FIGS. 8B, 8C, 8D, 9B, 9C, 10B, 11B, and 12B.

Consider, for example, the cases shown in FIGS. 8A to 8F. When encoding of the frame 10 is complete, the frame to be encoded next is the frame 14, as shown in FIG. 8A. In this case, if the OUT point is the frame 13 as shown in FIG. 8C, the frame 14 to be encoded next is located after the OUT point. In addition, since the picture type of the frame 14 to be encoded next is I, the picture type is changed from I to B, and the frame 13 is changed to P and encoded instead of the frame 14.

If the picture type of the frame to be encoded next is not I, the GOP structure is changed first to terminate the current GOP at the OUT point, and then encoding is performed (step 14). This processing corresponds to, for example, the cases shown in FIGS. 8A, 8E, 8F, 9A, 9D, 9E, 10A, 10C, 10D, 11A, 11C, 11D, 11E, 12A, 12C, and 12D.

Assume that the frame 14 is the OUT point, as shown in FIG. 12C. In this case, when encoding of the frame 13 is complete, the frame to be encoded next is the frame 15, as shown in FIG. 12A. In this case, the frame 15 to be encoded next is located after the OUT point. In addition, since the picture type of the frame 15 to be encoded next is P as shown in FIG. 12A, the picture type of the frame 14 is changed to P to terminate the current GOP.

As shown in FIGS. 3A to 4B, in MPEG encoding, I-Pictures or P-Pictures between which B-Pictures are located are generally encoded first, and then the B-Pictures are encoded. That is, if it is determined in step 11 in FIG. 13 that an OUT point is detected, the picture type of the frame to be encoded next is either I or P regardless of the picture type (I-Picture, P-Picture, and B-Picture) of a frame at which the OUT point is set in the normal GOP structure. According to the second embodiment of the present invention, GOP structure control can be performed without any delay by only checking whether the a frame to be encoded next is at or after the OUT point.

Assume that the frame B13 is an OUT point in the case in FIGS. 4A and 4B, i.e., a case corresponding the case in FIG. 8C occurs, as shown in FIGS. 14A and 14B. In this case, when encoding of the frame I14 in FIGS. 4A and 4B starts, the OUT point is detected. In this case, the frame I14 is not encoded, but the frame B13 is encoded as the frame P13 which is a P-Picture. Then, the frame B12 is encoded. With this operation, encoding corresponding to the case in FIG. 8C can be controlled without any delay.

According to the method of the first embodiment, when a random access point (i.e., an OUT point) is set by using a time code, it is required to check the presence/absence of an OUT point throughout one succeeding GOP or more. In contrast to this, according to the second embodiment, there is no need to check the presence/absence of an OUT point in the forward direction, and hence simpler control can be realized. In addition, when a random access point is to be inserted in synchronism with automatic detection of a scene change or is to be set by the user in real time, a check on an OUT point in the forward direction cannot be performed in some case. In this case, a control delay occurs in the first embodiment. In the'second embodiment, however, such a problem does not arise.

Furthermore, according to the second embodiment of the present invention, a decrease in encoding efficiency can be suppressed without any control delay.

The encoding methods of the first and second embodiments can be implemented as computer programs that can be executed by a processor. The same effects as described above can be obtained by installing these computer programs in the encoding apparatus in FIG. 1 through a recording medium or providing the programs as general-purpose encoding control programs that can be executed by a general computer through a recording medium.

The use of a recording medium on which data encoded by the encoding methods of the first and second embodiment are recorded allows easy implementation of random access to a point desired by the user,.linking of encoded data in units of random access points, and the like without any deterioration in picture quality.

Note that first and second embodiments may be executed independently or in combination with each other. More specifically, when a random access point is set by using a time code, an OUT point is detected in the forward direction, and the GOP immediately preceding the random access point is extended by using the method of the first embodiment of the present invention. When a random access point is set in synchronism with scene change detection or set in accordance with an instruction from the user in real time during encoding, GOP structure control is performed by using the method of the second embodiment of the present invention. This prevents a decrease in encoding efficiency due to setting of a random access point, and allows setting of a random access point to an appropriate position while eliminating a control delay due to the setting of the random access point.

In the above description, a random access point is set in consecutive encoded data. However, the same processing can also be applied to a portion at the end of encoding. More specifically, when the final frame to be encoded does not coincide with the end of a GOP, the GOP structure to which the final frame belongs can be properly changed by setting the final frame as an OUT point by using the method of the embodiment described above.

As has been described above, according to the present invention, when a random access point at which random access is allowed is to be set to a picture series in motion compensated predictive video encoding, a random access position is detected in the forward direction, and control is performed to inhibit any intra-coded frame from appearing in a predetermined frame interval immediately preceding the random access point, thereby preventing a decrease in encoding efficiency at the random access point boundary. This allows setting of a random access point without degrading the picture quality of an encoded picture.

In addition, a random access point boundary and encoded picture type are checked by using the difference between the input order and encoding order of a video signal. This allows control to inhibit an intra-coded frame from appearing in a predetermined frame interval immediately preceding the random access point without detecting the random access point in the forward direction, thus allowing setting of a random access point without any delay and preventing a decrease in encoding efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoding method comprising:
   selectively performing intra-frame coding and motion compensated predictive inter-frame coding for each of a plurality of frame series in units of frames;
   setting a first intra-coded frame used for playback from a designated frame to a frame series corresponding to the designated frame in addition to a second intra-coded frame set at a predetermined frame interval, to designate a random access point, which allows playback from a designated frame, to the frame series; and
   encoding the second intra-coded frame set at the predetermined frame interval and immediately preceding the first intra-coded frame set for the random access after switching to motion compensated predictive inter-frame coding.

2. A method according to claim 1, further comprising setting a random access point by using one of a first method of using a time code indicating a temporal position of an input frame, a second method of detecting a scene change point of input video and using the detected point, and a third method of using instruction information input by a user in real time during encoding of input video.

3. A method according to claim 2, further comprising changing a frame immediately preceding the access point into a P-Picture.

4. A video encoding apparatus comprising:
   an encoder which selectively subjects a plurality of frame series to intra-frame encoding and motion compensated predictive inter-frame coding in units of frames;
   a position designation section which designates a setting position of a random access point which allows playback from at least one arbitrary frame of a plurality of frame series; and
   an intra-coding setting section which sets a first intra-coded frame used for playback from the designated frame to a frame series corresponding to a designated frame in addition to a second intra-coded frame set to a frame series at the predetermined frame interval, to set a random access point, which allows playback from a designated frame, to the frame series, and wherein
   the encoder encodes the second intra-coded frame set at the predetermined frame interval and immediately preceding the first intra-coded frame set for the random access after switching to motion compensated predictive inter-frame coding.

5. An apparatus according to claim 4, wherein said position designation section comprises at least one of a designator which designates the setting position by using a time code indicating a temporal position of an input frame, a designator which designates the setting position by detecting a scene change point of input video and using the detected point, and a designator which designates the setting position by using instruction information input by a user in real time during encoding of input video.

6. An apparatus according to claim 5, wherein said encoder changes a frame immediately preceding the access point into a P-Picture.

7. A video encoding method compromising
selectively subjecting a plurality of frame series to intra-frame encoding and motion compensated predictive inter-frame coding in units of frames, the motion compensated predictive inter-frame coding being performed by using an inter-frame prediction structure constituted by forward prediction encoded frames set at a frame interval of not less than one frame and bidirectional prediction encoded frames arranged between the forward prediction encoded frames;
setting a first intra-coded frame used for playback from a designated frame to a frame series corresponding to t he designated frame in addition to a second intra-coded frame set to the frame series at a predetermined frame interval, to set a random access point which allows playback from a designated frame; and
when a first encoded frame, other than the bidirectional prediction encoded frames, temporally located immediately before the first intra-coded frame set for the random access is an intra-coded frame, encoding the intra-coded frame in accordance with the motion compensated predictive inter-frame coding.

8. A method according to claim 7, further comprising: setting a random access point by using one of a first method of using a time code indicating a temporal position of an input frame, a second method of detecting a scene change point of input video and using the detected point, and a third method of using instruction information input by a user in real time during encoding of input video.

9. A video encoding apparatus comprising:
an encoder which selectively subjects a plurality of frame series to intra-frame encoding and motion compensated predictive inter-frame coding in units of frames, the motion compensated predictive inter-frame coding being performed by using an inter-frame prediction structure constituted by forward prediction encoded frames set at a frame interval of not less than one frame and bidirectional prediction encoded frames arranged between the forward prediction encoded frames;
a designation section which designates a setting position of a random access point which allows playback from an arbitrary frame; and
a setting section which sets a first intra-coded frame used for playback from a designated frame to a frame series corresponding to the designated frame in addition to a second intra-coded frame set to the frame series at the predetermined frame interval, to set a random access point which allows playback from the designated frame, and wherein
when a first encoded frame, other than the bidirectional prediction encoded frames, temporally located immediately before the first intra-coded frame set for the random access is an intra-coded frame, the encoder encodes the intra-coded frame in accordance with the motion compensated predictive inter-frame coding.

10. An apparatus according to claim 9, wherein said designation section comprises at least one of a designator which designates the setting position by using a time code indicating a temporal position of an input frame, a designator which designates the setting position by detecting a scene change point of input video and using the detected point, and a designator which designates the setting position by using instruction information input by a user in real time during encoding of input video.

11. A video encoding method comprising:
selectively subjecting a plurality of frame series to intra-frame encoding and motion compensated predictive inter-frame coding for in units of frames;
encoding the frames while dividing the encoded data into encoded frame groups each having a predetermined inter-frame prediction structure by setting an intra-coded frame to a predetermined frame interval;
checking whether a random access point is set to a frame in a next frame group every time encoding of a currently encoded frame group is complete; and
changing an inter-frame prediction structure to extend the currently encoded frame group to a frame immediately preceding a setting position of the random access point when the random access point is set.

12. A video encoding method comprising:
selectively subjecting a plurality of frame series to intra-frame encoding and motion compensated predictive inter-frame coding in units of frames;
encoding the frames while dividing the data into encoded frame groups each having a predetermined inter-frame prediction structure by setting an intracoded frame to the frame series at a predetermined frame interval;
checking whether a setting position of a random access point which allows playback from an arbitrary frame is temporally located after the intra-coded frame in the predetermined interval in the encoded frame group immediately preceding the setting position; and
terminating the immediately preceding encoded frame group at a frame immediately preceding the random access point, when the random access point is temporally set after the intra-coded frame in the predetermined interval, and extending the immediately preceding encoded frame group to a frame immediately preceding the random access point, when the random access is set temporally before the intra-coded frame in the predetermined interval.

13. A video encoding method comprising:
reordering a plurality of input video data corresponding to a plurality of pictures of each of a plurality of picture series in an encoding order; and
encoding each of the video data,
the encoding which includes:
selectively executing intra-frame encoding and inter-frame prediction encoding;
setting an intra-coded frame in the picture series at a predetermined frame interval;
selectively designating an access point in the picture series; and
extending a picture series immediately preceding the access point to a picture immediately preceding the access point, and changing a structure of the picture series in accordance with a designated position of the access point to make a picture immediately succeeding the access point become a first picture of a next picture series.

14. A method according to claim 13, wherein the selectively designating includes at least one of a first method of designating an access point by using a time code indicating a temporal position of input video data, a second method of detecting a scene change point of input video and automatically designating an access point by using the detected point, and a third method of designating an access point in real time during encoding.

15. A method according to claim 13, wherein each of the plurality of picture series comprises a plurality of GOPs (Groups of pictures) each including an I-Picture, P-Pictures, and B-pictures, and the changing of the structure of the picture series comprises extending a GOP immediately preceding an access point to the access point, and changing a final picture of the extended GOP into a P-Picture.

16. A method according to claim 15, wherein the changing of the structure of the picture series comprises inhibiting forward prediction for a B-Picture at a beginning of a GOP immediately succeeding an access point to make the GOP become a closed GOP.

17. A method according to claim 15, wherein the changing of the structure of the picture series comprises extending the GOP immediately preceding the access point, when an access point is designated at a first I-Picture in a GOP or a picture preceding the I-Picture in a display order, and terminating the GOP immediately before the access point and setting a GOP shorter than a normal GOP to a GOP series, when an access point is designated at a position succeeding the first I-Picture.

18. A method according to claim 15, wherein the changing of the structure of the picture series comprises inhibiting forward prediction for a B-Picture at a beginning of a GOP immediately succeeding an access point to make the GOP become a closed GOP without changing a GOP structure, when a GOP boundary coincides with the access point.

19. A method according to claim 15, wherein the changing of the structure of the picture series comprises forming a new GOP having a smaller number of pictures than a normal GOP immediately preceding the access point, when an access point is designated at a position a predetermined number of pictures, which corresponds to an interval between I-Pictures or P-Pictures in a GOP, ahead of a beginning of the GOP in the display order.

20. A video encoding apparatus comprising:
a picture reordering section for reordering a plurality of input video data corresponding:to a plurality of frames of each of a plurality of frame series in an encoding order; and
an encoding section for encoding each of the video data, said encoding section including:
an encoder for selectively executing intra-frame encoding and inter-frame prediction encoding; and
a control section for executing processing of setting an intra-coded picture to the frame series in a predetermined frame interval, processing of selectively designating an access point in the frame series, and processing of extending a frame series immediately preceding the access point to a frame immediately preceding the access point, and changing a structure of the frame series in accordance with a designated position of the access point to make a frame immediately succeeding the access point become a first frame of a next frame series.

21. An apparatus according to claim 20, wherein said control section executes one of a first designation method of designating an access point by using a time code indicating a temporal position of input video data, a second designation method of detecting a scene change point of input video and automatically designating an access point by using the detected point, and a third designation method:of designating an access point in real time during encoding.

22. An apparatus according to claim 20, wherein each of the plurality of picture series comprises a plurality of GOPs (Groups of pictures) each including an I-Picture, P-Pictures, and B-pictures, and said control section executes processing of extending a GOP immediately preceding an access point to the access point, and changing a final picture of the extended GOP into a P-Picture.

23. An apparatus according to claim 22, wherein said control section executes processing of inhibiting forward prediction for a B-Picture at a beginning of a GOP immediately succeeding an access point to make the GOP become a closed GOP.

24. An apparatus according to claim 22, wherein said control section executes processing of extending the GOP immediately preceding an access point, when the access point is designated at a first I-Picture in a GOP or a picture preceding the I-Picture in a display order, and terminating the GOP immediately before the access point and setting a GOP shorter than a normal GOP to a GOP series, when the access point is designated at a position succeeding the first I-Picture.

25. An apparatus according to claim 22, wherein said control section executes processing of inhibiting forward prediction for a B-Picture at a beginning of a GOP immediately succeeding an access point to make the GOP become a closed GOP without changing a GOP structure, when a GOP boundary coincides with the access point.

26. An apparatus according to claim 22, wherein said control section executes processing of forming a new GOP having a smaller number of pictures than a normal GOP immediately preceding an access point, when the access point is designated at a position a predetermined number of pictures, which corresponds to an interval between I-Pictures or P-Pictures in a GOP, ahead of a beginning of the GOP in the display order.

* * * * *